(12) United States Patent
Noeth

(10) Patent No.: US 11,072,060 B2
(45) Date of Patent: Jul. 27, 2021

(54) TOOL BIT ASSEMBLIES

(71) Applicant: Raymond A. Noeth, Lake Worth, FL (US)

(72) Inventor: Raymond A. Noeth, Lake Worth, FL (US)

(*) Notice: Subject to any disclaimer, the term of this patent is extended or adjusted under 35 U.S.C. 154(b) by 0 days.

(21) Appl. No.: 16/787,661

(22) Filed: Feb. 11, 2020

(65) Prior Publication Data

US 2020/0269328 A1    Aug. 27, 2020

Related U.S. Application Data

(60) Provisional application No. 62/809,946, filed on Feb. 25, 2019.

(51) Int. Cl.
| | | |
|---|---|---|
| *B25D 11/10* | (2006.01) | |
| *B23B 47/34* | (2006.01) | |
| *B25D 17/08* | (2006.01) | |
| B25B 23/00 | (2006.01) | |
| B23B 31/107 | (2006.01) | |
| B25B 21/02 | (2006.01) | |

(52) U.S. Cl.
CPC ............ *B25D 11/104* (2013.01); *B23B 47/34* (2013.01); *B25D 17/084* (2013.01); *B23B 31/1071* (2013.01); *B25B 21/02* (2013.01); *B25B 23/0035* (2013.01)

(58) Field of Classification Search
CPC ..... B25D 11/10; B25D 11/106; B25D 11/104; B25D 11/102; B25D 17/084; B25D 2211/065; B25D 17/005; B23B 31/1071; B23B 45/003; B23B 47/34; B23B 29/125; B25B 25/0035; B25B 21/026; B25B 21/023; Y10T 74/18304; Y10T 74/18048; Y10T 74/18032; Y10T 74/18016; Y10T 408/23; Y10T 74/18024
See application file for complete search history.

(56) References Cited

U.S. PATENT DOCUMENTS

| | | | | |
|---|---|---|---|---|
| 1,588,832 A * | 6/1926 | Young | ................... | B25D 11/102 74/56 |
| 2,401,794 A * | 6/1946 | Pratt | ..................... | B25D 11/104 173/95 |
| 2,657,383 A * | 11/1953 | Ford | ......................... | B25C 1/00 173/203 |
| 2,724,573 A * | 11/1955 | Lundquist | ............ | B25D 11/106 74/22 R |
| 3,149,681 A * | 9/1964 | Drew | ................... | B25D 11/102 173/97 |

(Continued)

*Primary Examiner* — Eric A. Gates
*Assistant Examiner* — Paul M Janeski
(74) *Attorney, Agent, or Firm* — Locke Lord LLP; Daniel J. Fiorello

(57) ABSTRACT

A tool bit assembly can include a housing comprising a channel at least partially extending into the housing, one or more interacting features in the channel, and a shaft configured to fit within a drill chuck to allow a drill to turn the shaft. The shaft can be at least partially disposed within the channel to rotate and slide relative to the housing. The shaft can include a striking structure configured to interact with the one or more interacting features in the channel to cause the housing to actuate linearly relative to the shaft if the shaft is rotated relative to the housing and the striking structure is positioned to interact with the one or more interacting features.

14 Claims, 13 Drawing Sheets

(56) References Cited

U.S. PATENT DOCUMENTS

| | | | | |
|---|---|---|---|---|
| 3,491,839 A * | 1/1970 | McIntire | ............... | B25D 11/102 |
| | | | | 173/93.6 |
| 5,992,538 A * | 11/1999 | Marcengill | .......... | B25D 11/102 |
| | | | | 173/171 |
| 6,684,964 B2 * | 2/2004 | Ha | ......................... | B25D 16/00 |
| | | | | 173/109 |
| 7,874,378 B2 * | 1/2011 | Chen | .................... | B25D 11/104 |
| | | | | 173/29 |
| 2007/0181321 A1 * | 8/2007 | Ha | ....................... | B25D 17/005 |
| | | | | 173/122 |

* cited by examiner

TOOL BIT ASSEMBLIES

CROSS-REFERENCE TO RELATED APPLICATIONS

This application claims priority to and the benefit of U.S. Provisional Application No. 62/809,946, filed Feb. 25, 2019, the entire contents of which are herein incorporated by reference in their entirety.

FIELD

This disclosure relates to tool bit assemblies, e.g., for use with drill chucks.

BACKGROUND

Drills, for example, can have a rotating chuck configured to receive a bit, e.g., a drill bit or driving bit. For linear actuation applications, e.g., for chipping applications, an entirely separate tool with a linear actuating motor is needed.

Such conventional embodiments have generally been considered satisfactory for their intended purpose. However, there is still a need in the art for improved embodiments. The present disclosure provides a solution for this need.

SUMMARY

A tool bit assembly can include a housing comprising a channel at least partially extending into the housing, one or more interacting features in the channel, and a shaft configured to fit within a drill chuck to allow a drill to turn the shaft. The shaft can be at least partially disposed within the channel to rotate and slide relative to the housing. The shaft can include a striking structure configured to interact with the one or more interacting features in the channel to cause the housing to actuate linearly relative to the shaft if the shaft is rotated relative to the housing and the striking structure is positioned to interact with the one or more interacting features.

In certain embodiments, the housing can include a bit mount configured to receive a bit to actuate the bit linearly when the shaft is rotated relative to the housing. The bit mount can be configured to receive and/or otherwise attach to any suitable type of bit (e.g., a chipping plate).

In certain embodiments, the tool bit assembly can include a limiting pin disposed through the housing and configured to limit a linear motion of the shaft to axially retain the shaft to the housing. In certain embodiments, the shaft can include a recessed diameter portion along a portion of a length of the shaft and configured to receive the pin such that a length of the recessed diameter portion defines a maximum distance of the linear motion of the shaft.

In certain embodiments, the shaft can be slidably retained to the housing such that the shaft is selectively engagable to the one or more interacting features by a user. For example, the length of the recessed diameter portion can be sized to allow the shaft to disengage from the one or more interacting features to allow the shaft to rotate freely relative to the housing without causing linear actuation of the housing. The housing can be configured to be gripped by a user's hand and pressed toward a drill when the shaft is installed in a drill chuck to engage the striking structure to the one or more interacting features.

In certain embodiments, the tool bit assembly can include a sheath disposed between the shaft and the housing at least partially within the channel. The sheath can be made of a plastic or silicone, and the shaft and the housing can be made of metal (e.g., tool steel). Any other suitable materials for the sheath (e.g., to act as a low friction surface or protective surface), and/or for the shaft and housing are contemplated herein.

In certain embodiments, the one or more interacting features can include one or more balls disposed in or formed from the housing and positioned between the housing and the striking structure in the channel. The striking structure can include one or more ramps for each ball. Each ramp can be configured to slide relative to each ball with rotation of the shaft relative to each ball in at least a first direction of rotation to cause linear actuation when the shaft is pressed against the one or more balls.

In certain embodiments, the one or more balls can include a plurality of free moving balls. The plurality of free moving balls can be at least partially limited in circumferential rotational motion within the channel by at least one protrusion extending into the channel, for example. In certain embodiments, the at least one protrusion can include a pin disposed through the housing and at least partially extending into the channel.

In certain embodiments, the one or more ramps can be configured to apply force to the one or more free moving balls such that at least one of the free moving balls are caught on the at least one protrusion and cannot move past the at least one protrusion in the first direction of rotation of the shaft, thereby causing reciprocating linear motion between the shaft and the housing in the first direction of rotation of the shaft. In certain embodiments, the striking structure can include at least one push face configured to apply force to the one or more free moving balls in a second direction of rotation such that at least one of the free moving balls move on top of the at least one protrusion creating axial distance between the shaft and the housing, thereby causing relative linear motion between shaft and the housing in the second direction of rotation. In this regard, bidirectional rotational conversion is enabled. Any other suitable bidirectional rotational conversion is contemplated herein.

The one or more balls can include two balls. Each ball can have a diameter of ½ of a diameter of the channel, for example. The one or more ramps can include two ramps disposed at an axial end of the shaft. Each push face can be a back side of each ramp, for example. Any other suitable number of balls and/or ramps and/or push faces, and any other suitable configuration for the balls and/or ramps and/or push faces are contemplated herein.

In certain embodiments, the channel can extend through the entire housing. The shaft can include a bit attachment extension (e.g., extending axially from the striking structure) configured to receive a bit to provide rotation and selective linear actuation to the bit. Any suitable configuration for the bit attachment extension is contemplated herein.

In accordance with at least one aspect of this disclosure, a power drill attachment configured to be received by a chuck of the power drill and to convert rotational motion of the drill into reciprocating linear motion. The attachment can be configured to be selectively actuated by a user to cause reciprocating linear actuation or to disengage linear actuation. The power drill attachment can be configured to be bidirectional such that rotation in either direction causes reciprocating linear actuation.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1A:
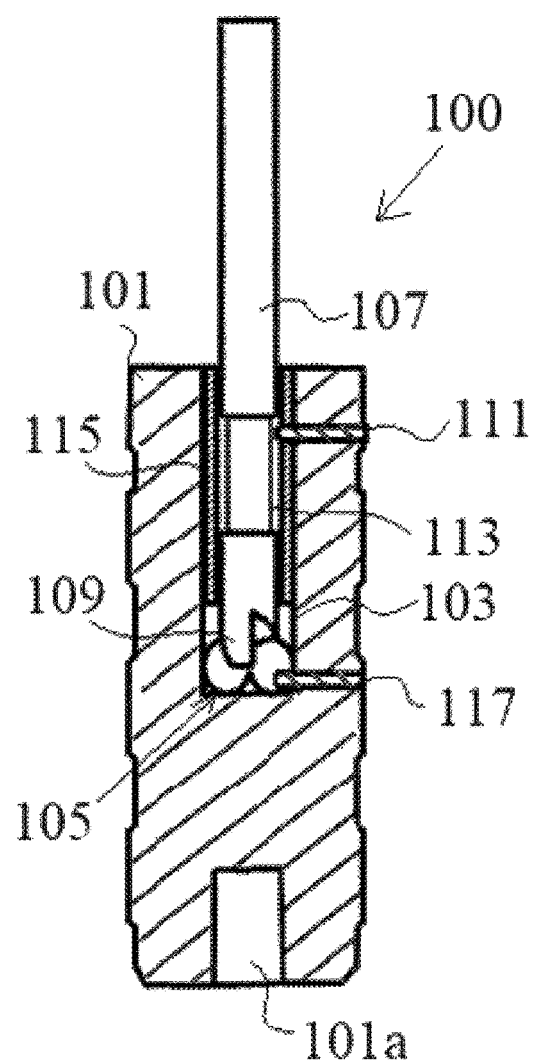
FIG. 1A is a partial cross-sectional view of an embodiment of an assembly in accordance with this disclosure, wherein the shaft and the interaction features are not shown in cross-section.
Figure 1B:
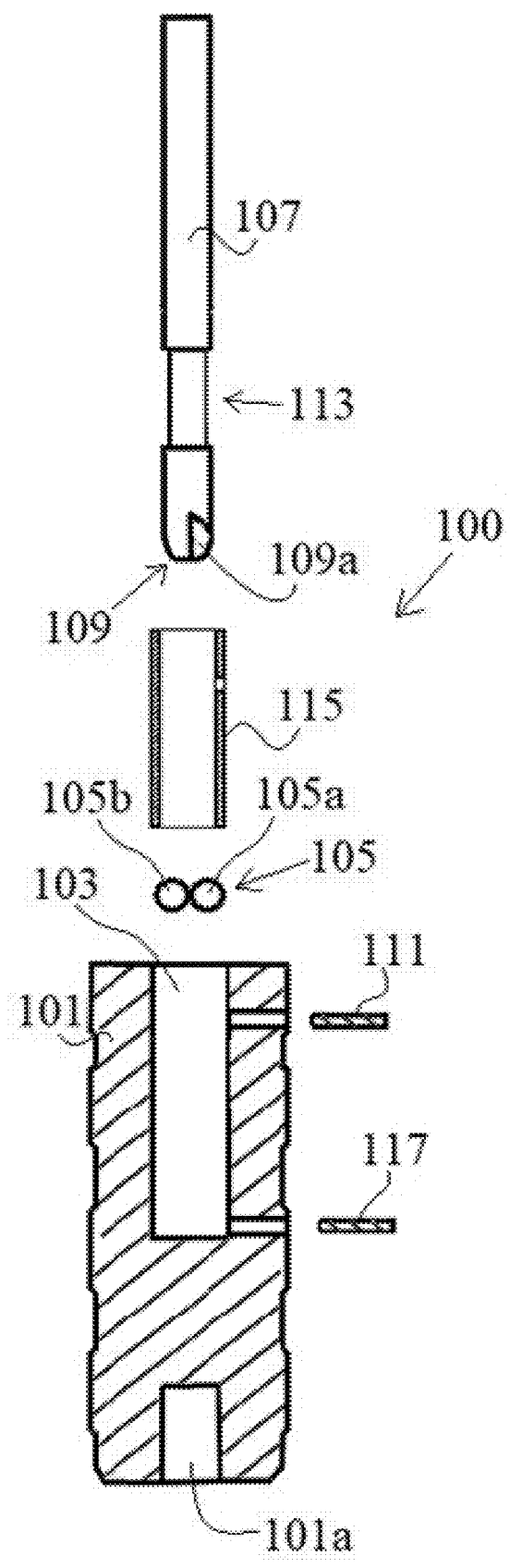
FIG. 1B is an exploded view of the embodiment shown in FIG. 1A.
Figure 1C:
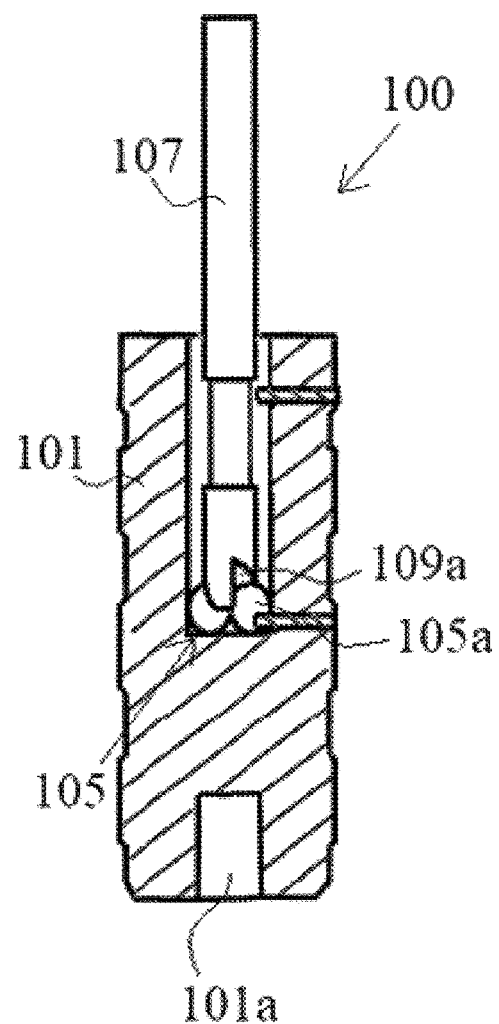
FIG. 1C is a partial cross-sectional view of the embodiment of FIG. 1A, shown without a sheath in accordance with this disclosure.
Figure 1D:
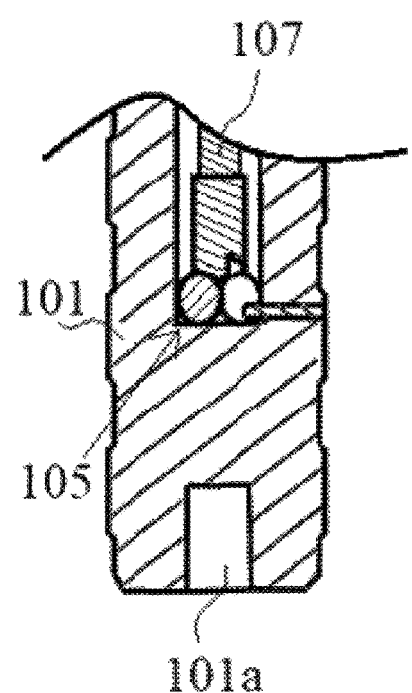
FIG. 1D is a partial cross-sectional view of the embodiment of FIG. 1A, where the shaft and the interaction features are shown in cross-section.
Figure 1E:
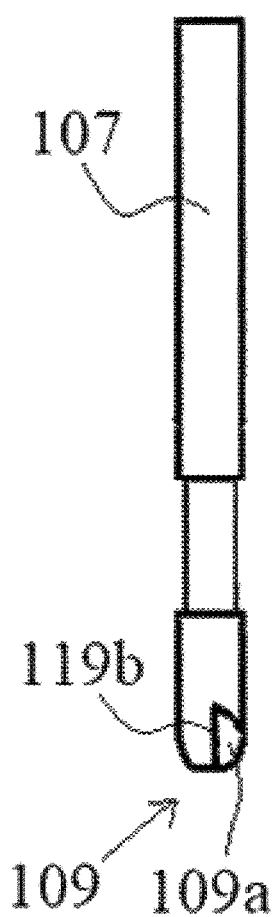
FIG. 1E is an elevation view of the embodiment of a shaft shown in FIG. 1A.
Figure 1F:
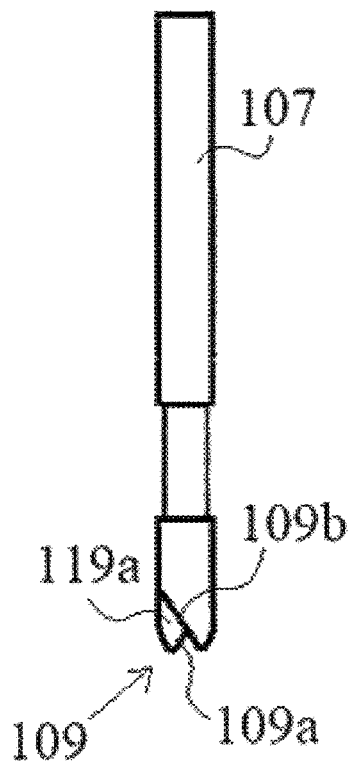
FIG. 1F is an elevation view of the shaft of FIG. 1E, shown rotated 90 degrees.
Figure 1G:
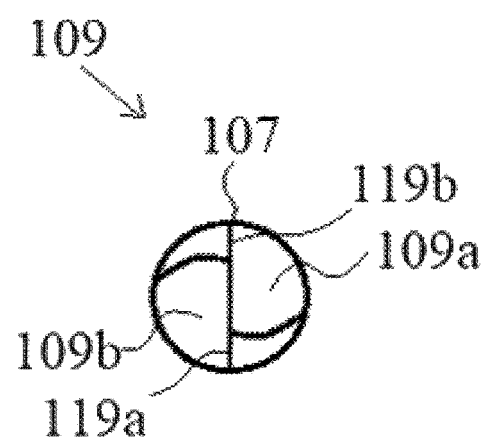
FIG. 1G is a plan view of the shaft of the FIG. 1E, showing a plan view of the embodiment of a striking structure of the embodiment of FIG. 1A.

Reference will now be made to the drawings wherein like reference numerals identify similar structural features or aspects of the subject disclosure. For purposes of explanation and illustration, and not limitation, an illustrative view of an embodiment of an assembly in accordance with the disclosure is shown in FIG. 1 and is designated generally by reference character 100. Other embodiments and/or aspects of this disclosure are shown in FIGS. 1B-7. Certain embodiments described herein can be used with a standard hand power drill to provide reciprocating linear motion to an attachable bit for any suitable purpose.

Referring to FIGS. 1A-1G, a tool bit assembly 100 can include a housing 101 comprising a channel 103 at least partially extending into the housing 101. The assembly 100 can include or more interacting features 105 in the channel 103. The one or more interacting features 105 can be formed from the housing 101 or disposed within the housing 101 in the channel 103 for example.

The assembly 100 can include a shaft 107. The shaft 107 can be configured to fit within a drill chuck of a drill to allow a drill to turn the shaft 107. Embodiments of the shaft 107 can include any suitable dimensions and can be configured to operate with any suitable rotational source for rotational-to-linear motion conversion in any application.

The shaft 107 can be at least partially disposed within the channel 103 to rotate and slide relative to the housing 101. The shaft 107 can include a striking structure 109 configured to interact with the one or more interacting features 105 in the channel 103 to cause the housing 101 to actuate linearly relative to the shaft 107 if the shaft 107 is rotated relative to the housing 101 and the striking structure 109 is positioned to interact with the one or more interacting features 105 (e.g., such that shaft 107 is pressed into the one or more interacting features 105).

In certain embodiments, the housing 101 can include a bit mount 101a configured to receive a bit (not shown) to actuate the bit linearly when the shaft 107 is rotated relative to the housing 101. The bit mount 101a can be configured to receive and/or otherwise attach to any suitable type of bit (e.g., a chipping plate such as a chisel). The bit mount 101a can be configured to receive a desired bit, and can retain the bit with a pin through the housing to lock the bit in the bit mount 101a, for example. Any suitable type of bit mount (e.g., a recess as shown, a protrusion) is contemplated herein.

In certain embodiments, the tool bit assembly 100 can include a limiting pin 111 disposed through the housing 101 (e.g., in a first pin hole thereof) and configured to limit a linear motion of the shaft 107 to axially retain the shaft 107 to the housing 101. In certain embodiments, the shaft 107 can include a recessed diameter portion 113 along a portion of a length of the shaft 107. The recessed diameter portion 113 can be configured to receive the limiting pin 111 such that a length of the recessed diameter portion 113 defines a maximum distance of the linear motion of the shaft 107.

In certain embodiments, e.g., as shown in FIG. 1A, the shaft 107 can be slidably retained to the housing 101 such that the shaft 107 is selectively engagable to the one or more interacting features 105 by a user. For example, the length of the recessed diameter portion 113 can be sized to allow the shaft 107 to disengage from the one or more interacting features 105 to allow the shaft 107 to rotate freely relative to the housing 101 without causing linear actuation of the housing 101. The housing 101 can be configured to be gripped by a user's hand and pressed toward a drill (not shown) when the shaft 107 is installed in (e.g., gipped by) a drill chuck to engage the striking structure 109 to the one or more interacting features 105. This can allow a user to manually engage and/or disengage the housing 101 from the shaft 107 and/or control an amount of engagement to control a power of a the linear actuation.

In certain embodiments, the tool bit assembly 100 can include a sheath 115 disposed between the shaft 107 and the housing 101 at least partially within the channel 103. In certain embodiments, the sheath 115 can be made of a plastic or silicone, for example, and the shaft 107 and the housing 107 can be made of metal (e.g., tool steel). Any other suitable materials for the sheath 115 (e.g., to act as a low friction surface or protective surface), and/or for the shaft 107 and housing 101 are contemplated herein.

In certain embodiments, e.g., as shown in FIGS. 1A-3B, the one or more interacting features 105 can include one or more balls 105a, 105b disposed in or formed from the housing 101 and positioned between the housing 101 and the striking structure 109 in the channel 103. The striking structure 109 can include one or more ramps 109a, 109b for each ball 105a, 105b. Each ramp 109a, 109b can be configured to slide relative to each ball 105a, 105b with rotation of the shaft 107 relative to each ball 105a, 105b in at least a first direction of rotation (e.g., clockwise) to cause linear actuation when the shaft 107 is pressed against the one or more balls 105a, 105b.

In certain embodiments, the one or more balls 105a, 105b can include a plurality of free moving balls 105a, 105b. The plurality of free moving balls 105a, 105b can be at least partially limited in circumferential rotational motion within the channel 103 by at least one protrusion 117 extending into the channel 103, for example. In certain embodiments, the at least one protrusion 117 can include a pin, e.g., as shown, disposed through the housing 101 and at least partially extending into the channel 103. Any pin disclosed herein can be any suitable type of pin (e.g., a screw pin threaded to the housing 101 and configured to be tightened by a user), and can be removable or permanent. Any suitable type of other fastener is contemplated herein.

Figure 2A:
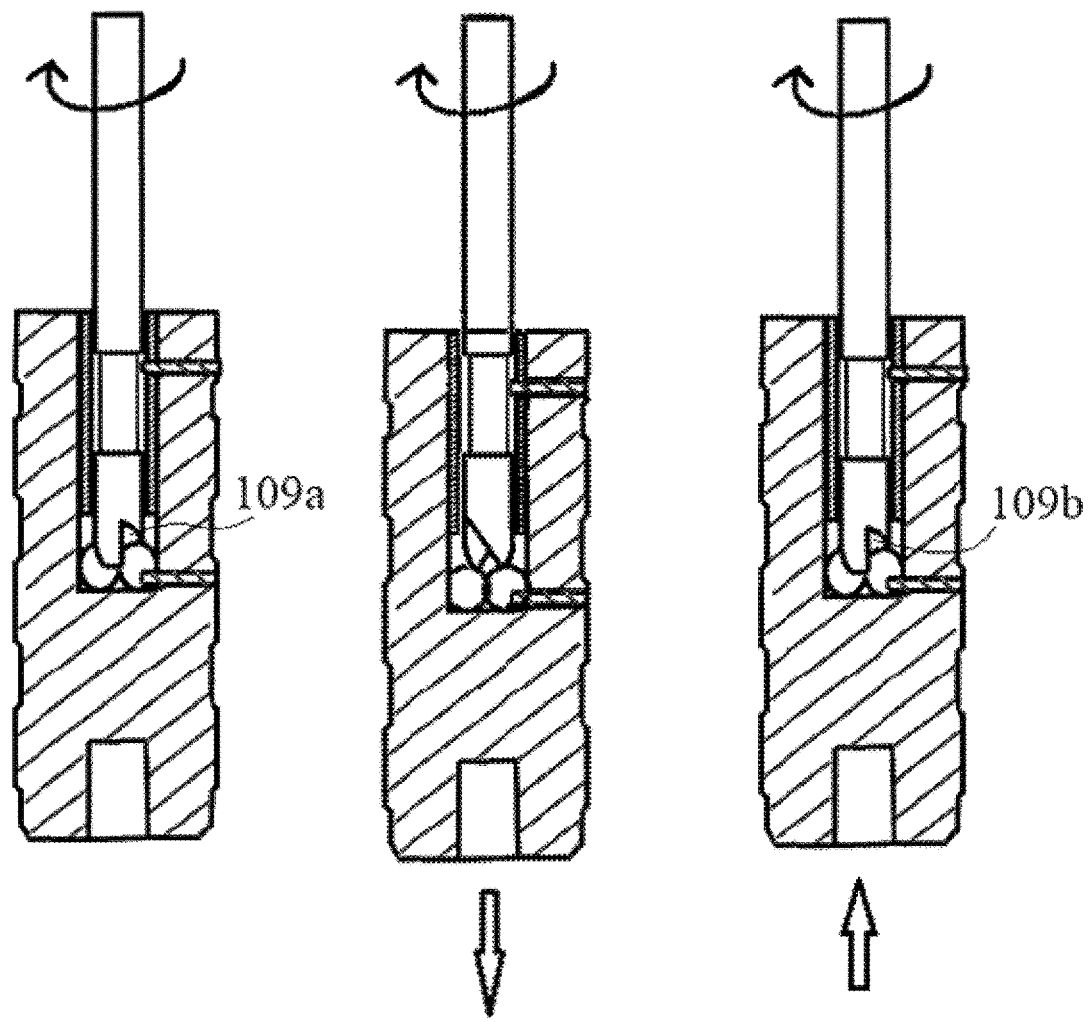
FIG. 2A shows an operation of the embodiment of FIG. 1A in a first rotational direction of the shaft, showing reciprocal linear actuation.
Figure 2B:
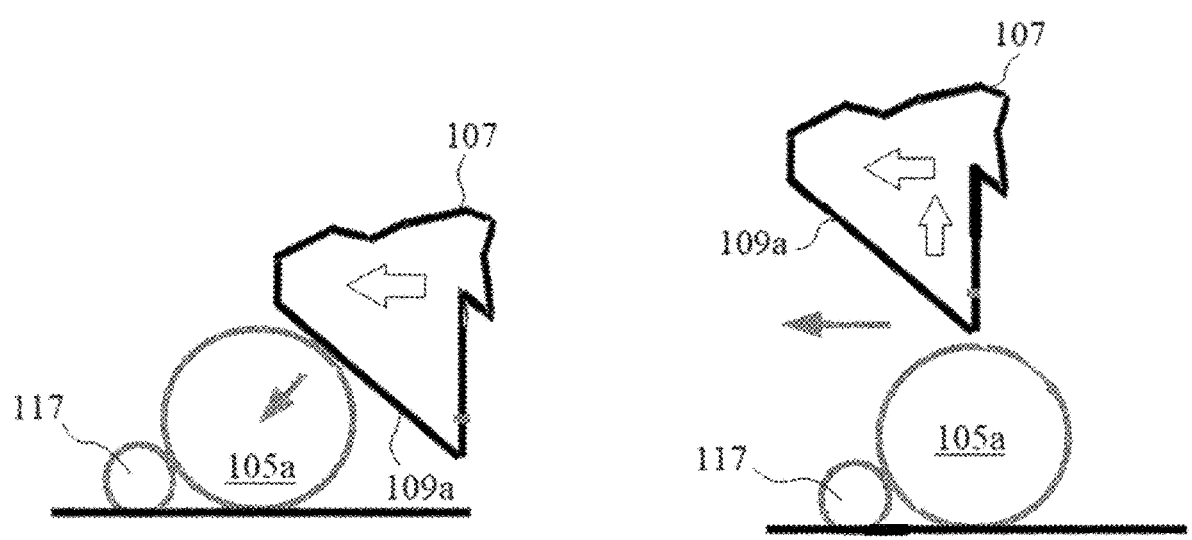
FIG. 2B schematically shows the interaction between the striking structure and the one or more interaction features of the embodiment of FIG. 1A in the first direction of rotation as shown in FIG. 2A.

In certain embodiments, referring FIGS. 1A-2B, the one or more ramps 109a, 109b can be configured to apply force to the one or more free moving balls 105a, 105b such that at least one of the free moving balls (e.g., 109a as shown) are caught on the at least one protrusion 117 and cannot move past the at least one protrusion 117 in the first direction of rotation of the shaft 107. For example, as shown, the line of force applied to the ball 105a by the ramp 109a in FIGS. 2A and 2B is angular, which pushes the ball 105a into the protrusion 117, preventing the ball 105a from moving further and causing the shaft 107 to lift relative to the ball 105a. After the ramp 109a passes over the ball, the striking structure 109 can be configured to allow the shaft 107 to fall back. This motion causes reciprocating linear motion between the shaft 107 and the housing 101 in the first direction of rotation of the shaft 107, for example.

Figure 3A:
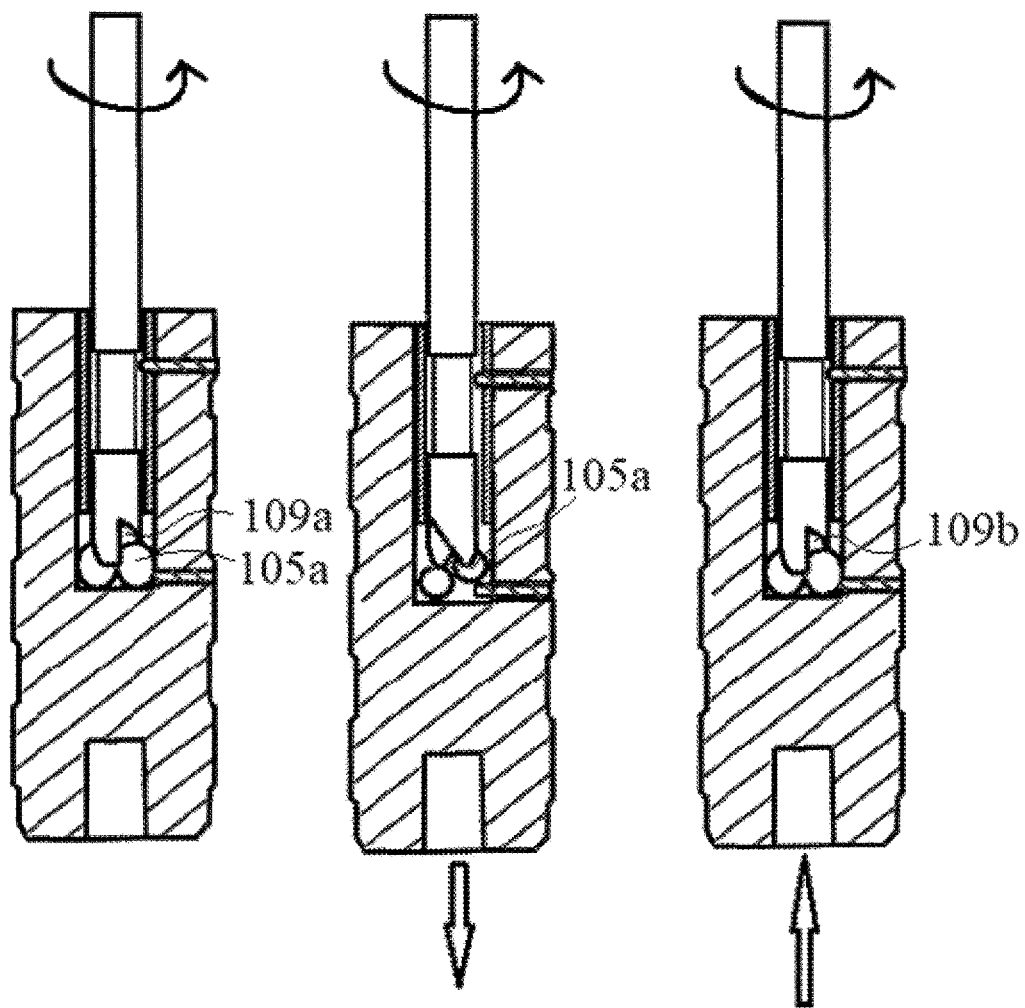
FIG. 3A shows an operation of the embodiment of FIG. 1A in a second rotational direction of the shaft opposite the first direction of rotation, showing reciprocal linear actuation.
Figure 3B:
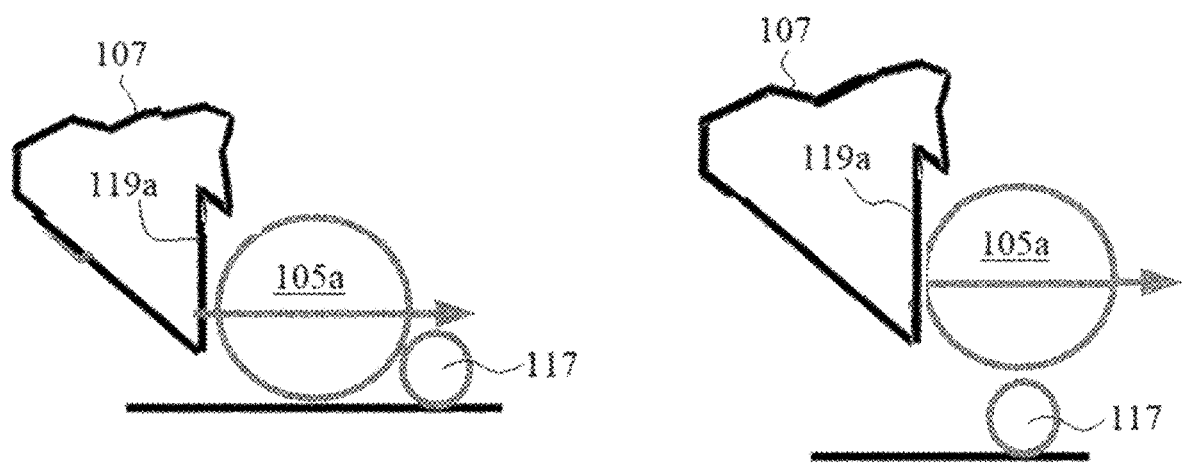
FIG. 3B schematically shows the interaction between the striking structure and the one or more interaction features of the embodiment of FIG. 1A in the second direction of rotation as shown in FIG. 3A.

In certain embodiments, referring to FIGS. 1A-1G, 3A, and 3B, the striking structure 109 can include at least one push face 119a, 119b configured to apply force to the one or more free moving balls 105a, 105b in a second direction of rotation (e.g., counter clockwise) such that at least one of the free moving balls (e.g., 105a as shown) move on top of the at least one protrusion 117 creating axial distance between the shaft 107 and the housing 101. For example, as shown in FIGS. 3A and 3B, the line of force applied to the ball 105a by the push face 119a is horizontal and/or high enough to cause the ball 105a to lift and/or roll over the protrusion 117, which pushes the ball 105a axially against the striking structure 109 causing the shaft 107 to lift with the ball 105a relative to the housing 101. After the ball 105a passes over the protrusion 117, the shaft 107 can fall back with the ball 105a. This motion causes relative linear motion between shaft 107 and the housing 101 in the second direction of rotation (e.g., for intentional bidirectional use or at least to prevent locking up to provide safety in case a user selects an incorrect rotational direction of a drill). In this regard, bidirectional rotational conversion is enabled, for example. In certain embodiments, the first direction of rotation and ensuing actuation can be a primary mode, and the second direction of rotation and ensuing reciprocation can be configured as a safety feature. Any other suitable structure and/or assembly to enable bidirectional rotational conversion is contemplated herein.

The size and/or number the one or more balls 105a, 105b and the shape and/or number of ramps 109a, 109b can be selected to provide a desired stroke length and/or frequency per rotational revolution. As shown in the embodiment of FIGS. 1A-1G, the one or more balls 105a, 105b can include two balls 105a, 105b. Each ball 105a can have a diameter of ½ of a diameter of the channel 103, for example. The one or more ramps 109a, 109b can include two ramps 109a, 109b disposed at an axial end of the shaft 107, e.g., as shown in the embodiment of FIGS. 1A-1G. Each push face 119a, 119b can be a back side of each ramp 109a, 109b, for example. While the push faces 119a, 119b are shown as vertical, it is contemplated that the push faces 109a, 109b can be angled or curved to allow a shoveling effect of the ball 105a, 105b over the protrusion. The one or more ramps 109a, 109b can have a liner angle (e.g., 45 degrees as shown) or a non-linear ramp. The balls 105a can be sized to be able to be lifted over the protrusion 117. Any other suitable number of balls and/or ramps and/or push faces, and any other suitable configuration for the balls and/or ramps and/or push faces are contemplated herein. Any other suitable configuration for the striking structure to convert rotational motion into reciprocating linear motion in at least one direction of rotational motion is contemplated herein.

Figure 4:
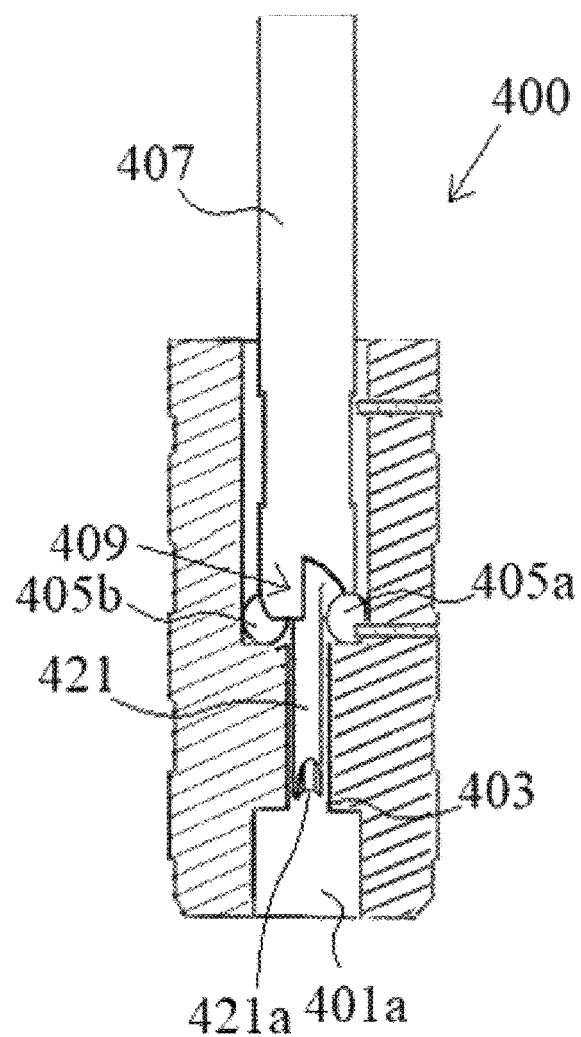
FIG. 4 is a partial cross-sectional view of an embodiment of an assembly in accordance with this disclosure, wherein the shaft and the interaction features are not shown in cross-section.

Referring to the embodiment of an assembly 400 of FIG. 4, the assembly 400 can be similar to the assembly 100 described above, for example. In certain embodiments, the channel 403 can extend through the entire housing 401 (e.g., and have one or more a smaller diameter portions after the interacting features). For example, the channel 403 can extend into and/or form the bit mount 401a.

The shaft 407 can include a bit attachment extension 421 (e.g., extending axially from the striking structure 409) configured to receive a bit (e.g., a drill bit, a drive bit) to provide rotation and selective linear actuation to the bit. The bit attachment extension 421 can include a standard bit socket 421a at a distal end thereof. As shown, the one or more balls 405a, 405b can be smaller in relative diameter compared to the embodiment of FIGS. 1A-1G to account for the diameter of the bit attachment extension 421. Any suitable configuration for the bit attachment extension 421 is contemplated herein.

Figure 5:
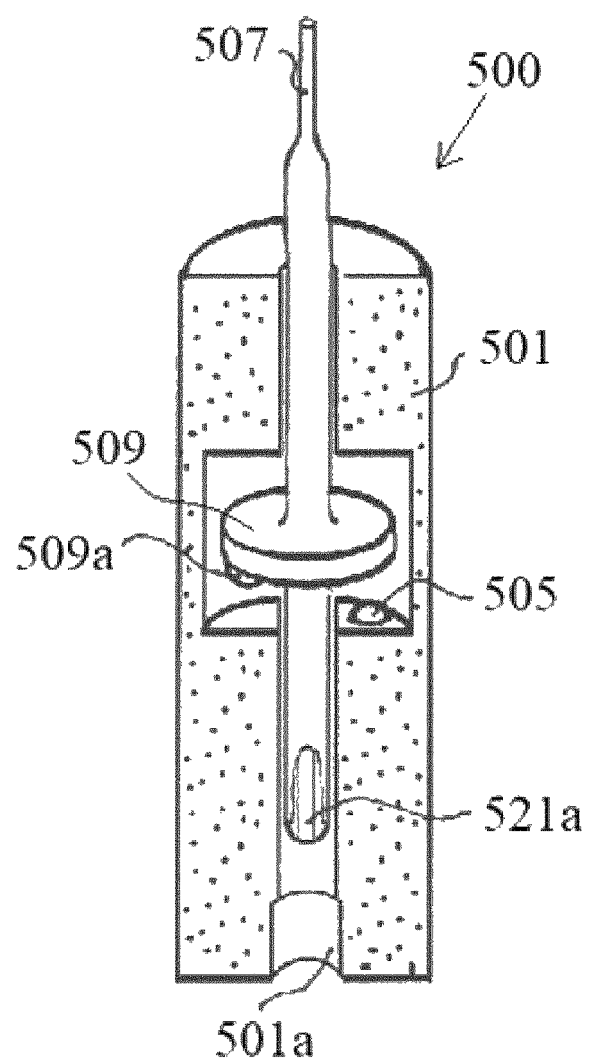
FIG. 5 is a partial cross-sectional view of an embodiment of an assembly in accordance with this disclosure, wherein the shaft is not shown in cross-section.
Figure 6:
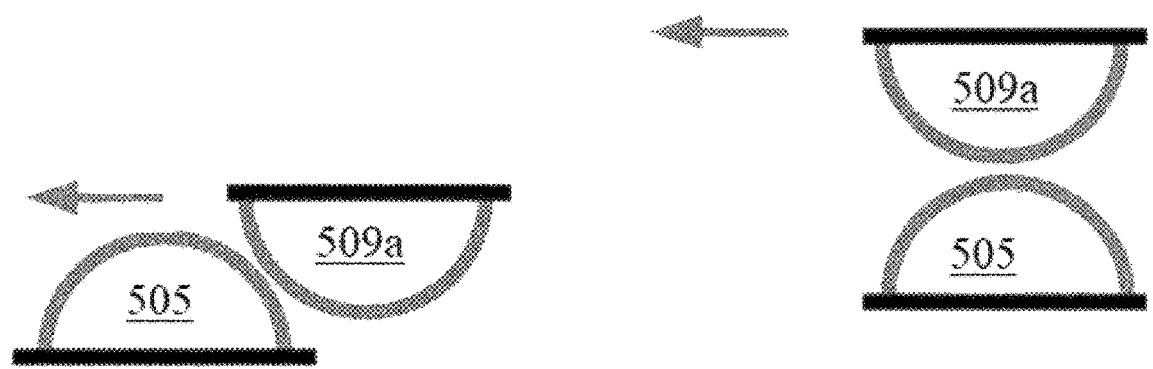
FIG. 6 schematically shows the interaction between the striking structure and the one or more interaction features of the embodiment of FIG. 5.
Figure 7:
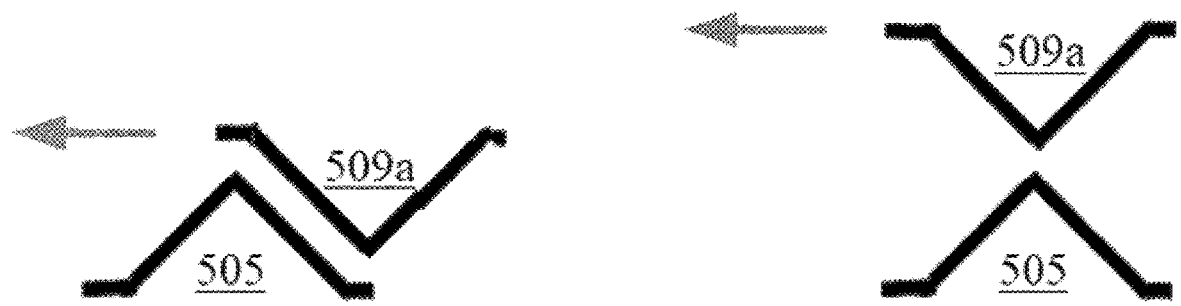
FIG. 7 schematically shows the interaction between the striking structure and another embodiment of one or more interaction features.

Referring to the embodiment of an assembly 500 of FIG. 5, the assembly 500 can be similar to the embodiment of FIG. 4, except have a different type of striking structure 509 with a raised portion 509a extending therefrom. The shaft 507 can be sized to fit a typical drill chuck, and can have a keyed bore 521a (e.g., similar or the same as bit socket 421a) to receive a quick connect drill chuck on the opposing end. As shown, the striking structure 509 can include a radially extending disc extending from the shaft 507 having the raised portion 509a extending therefrom. The disc can be mounted in a through hole and cavity of the housing 501 (e.g., a handgrip) allowing reciprocal movement of shaft 507 relative to the housing 501. The housing 501 can include one or more interacting features 505 (e.g., one or more raised surfaces), formed in the cavity and/or fixed to the housing 501. The raised portion 509a and/or the one or more interacting features 505 can include a semi-spherical shape, a ramp shape (e.g., a triangular shape), or any other suitable shape to interact with each other in rotation and to push the shaft 507 and disc apart (e.g., as shown in FIGS. 6 and 7).

While embodiments of an assembly are shown and described above, any other suitable construction for an assembly is contemplated herein.

In accordance with at least one aspect of this disclosure, a power drill attachment (e.g., assembly 100, 400) can be configured to be received by a chuck of the power drill and to convert rotational motion of the drill into reciprocating linear motion. The attachment can be configured to be selectively actuated by a user to cause reciprocating linear actuation or to disengage linear actuation. The power drill attachment can be configured to be bidirectional such that rotation in either direction causes reciprocating linear actuation.

Embodiments can transform a typical handheld power drill into a hammer drill or a power hammer. A user can install certain embodiments into a typical power drill to convert the rotation action into both rotation and percussion action or just percussion action to easily bore into concrete or power hammer materials such as chipping stone or working metals.

Typical power drills have rotating shanks that connect to tools that require rotation such as drill bits etc. In some cases, a percussion and rotation action is preferred over just rotation such as drilling through concrete or the like. Sometimes, just percussion is preferred to work some materials. In any event, a user previously would have to employ another type of drill that specifically designed for both percussion and rotation etc. These tools are usually larger and heavier than a typical drill. They also increase in size and weight if they employ options to switch from both to either rotation or percussion. Embodiments give the user an advantage of using just a typical power drill by converting its rotating energy to both rotation and percussion or just percussion action to extend a typical drill function of rotation only.

Certain embodiment can utilize a unique ball bearing and ramp assembly. The radius of the ball bearings can keep the contact surface to a minimum and a straight ramp can allow for a long angle and higher lift. Embodiments can include a V-shape shaft with a single angle surface completely across the shaft on one side and a single angle surface completely across the other side. The back side of either ramp can be vertically parallel to the shaft. This can provide a saw tooth pattern with a straight vertical angle on the backside. Certain embodiments can provide a longer lift by using almost a full one half turn to lift the shaft away from the bottom of the bore and letting the shaft drop back into the bore with the straight vertical side of the tooth. This drop at a more rapid rate can cause a hammer action and can also provide a deeper mesh between bearings and shaft as the V-shaped shaft can sit deeper into the valley of the two ball bearings when the shaft is at its lowest point. Certain embodiments can include a pin close to the bottom of the bearings so that when the bearing is pushed with an angler motion toward the pin and floor of the bore the bearings lock into place and the shaft can climb the bearing. But when in the reverse rotation the back vertical side of the tooth can push the bearing in a manner where the angle allowed the bearings and shaft to roll over and past the pin without locking the system up.

Embodiment can include a two angled surface shape tooth, e.g., a saw tooth, where the back side angle (e.g., of the pushing face) is a more abrupt angle, and the opposing raised surface is one or more balls that are locked from forward movement by pin. The forward movement of the longer angle side (e.g., the ramp) allows for more separation of the striking face and balls without additional torque on the shaft. The shorter back side angle together with a backward force can move the balls away from the pin, as the striking surface returns to a lower position, and allow for a more energized abrupt return direction of the reciprocal movement, giving the reciprocal movement a hammering affect. Certain embodiments also provide compactness of the mechanics that cause conversion from rotational motion to linear reciprocal motion.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A tool bit assembly, comprising:
   a housing comprising a channel at least partially extending into the housing;
   one or more interacting features in the channel; and
   a shaft configured to fit within a drill chuck to allow a drill to turn the shaft, the shaft being at least partially disposed within the channel to rotate and slide relative to the housing, the shaft including a striking structure configured to interact with the one or more interacting features in the channel to cause the housing to actuate linearly relative to the shaft if the shaft is rotated relative to the housing and the striking structure is positioned to interact with the one or more interacting features, wherein the one or more interacting features includes one or more balls disposed in or formed from the housing and positioned between the housing and the striking structure in the channel, wherein the striking structure includes one or more ramps for each ball, each ramp configured to slide relative to each ball with rotation of the shaft relative to each ball in at least a first direction of rotation to cause linear actuation when the shaft is pressed against the one or more balls, wherein the one or more balls include a plurality of free moving balls, wherein the plurality of free moving balls are at least partially limited in circumferential rotational motion within the channel by at least one protrusion extending into the channel, wherein the at least one protrusion includes a pin disposed through the housing and at least partially extending into the channel.

2. The tool bit assembly of claim 1, wherein the housing further includes a bit mount configured to receive a bit to actuate the bit linearly when the shaft is rotated relative to the housing.

3. The tool bit assembly of claim 1, further comprising a limiting pin disposed through the housing and configured to limit a linear motion of the shaft to axially retain the shaft to the housing.

4. The tool bit assembly of claim 3, wherein the shaft includes a recessed diameter portion along a portion of a length of the shaft and configured to receive the pin such that a length of the recessed diameter portion defines a maximum distance of the linear motion of the shaft.

5. The tool bit assembly of claim 4, wherein the length of the recessed diameter portion is sized to allow the shaft to disengage from the one or more interacting features to allow the shaft to rotate freely relative to the housing without causing linear actuation of the housing.

6. The tool bit assembly of claim 1, wherein the shaft is slidably retained to the housing such that the shaft is selectively engagable to the one or more interacting features by a user.

7. The tool bit assembly of claim 6, wherein the housing is configured to be gripped by a user's hand and pressed toward a drill when the shaft is installed in a drill chuck to engage the striking structure to the one or more interacting features.

8. The tool bit assembly of claim 1, further comprising a sheath disposed between the shaft and the housing at least partially within the channel.

9. The tool bit assembly of claim 8, wherein the sheath is made of a plastic or silicone, and the shaft and the housing are made of metal.

10. The tool bit assembly of claim 1, wherein the one or more ramps are configured to apply force to the one or more free moving balls such that at least one of the free moving balls are caught on the at least one protrusion and cannot move past the at least one protrusion in the first direction of rotation of the shaft, thereby causing reciprocating linear motion between the shaft and the housing in the first direction of rotation of the shaft.

11. The tool bit assembly of claim 10, wherein the striking structure includes at least one push face configured to apply force to the one or more free moving balls in a second direction of rotation such that at least one of the free moving balls move on top of the at least one protrusion creating axial distance between the shaft and the housing, thereby causing relative linear motion between shaft and the housing in the second direction of rotation.

12. The tool bit assembly of claim 11, wherein the one or more balls include two balls, each having a diameter of ½ of a diameter of the channel.

13. The tool bit assembly of claim 12, wherein the one or more ramps include two ramps disposed at an axial end of the shaft, wherein each push face is a back side of each ramp.

14. The tool bit assembly of claim 1, wherein the channel extends through the entire housing, wherein the shaft includes a bit attachment extension configured to receive a bit to provide rotation and selective linear actuation to the bit.

* * * * *